United States Patent
Zahniser

(10) Patent No.: US 9,813,608 B2
(45) Date of Patent: Nov. 7, 2017

(54) FAST AUTO-FOCUS IN IMAGING

(71) Applicant: Roche Diagnostics Hematology, Inc., Westborough, MA (US)

(72) Inventor: Michael Zahniser, Jamaica Plain, MA (US)

(73) Assignee: Roche Diagnostics Hematology, Inc., Westborough, MA (US)

( * ) Notice: Subject to any disclaimer, the term of this patent is extended or adjusted under 35 U.S.C. 154(b) by 229 days.

(21) Appl. No.: 14/719,841

(22) Filed: May 22, 2015

(65) Prior Publication Data

US 2015/0256739 A1 Sep. 10, 2015

Related U.S. Application Data

(63) Continuation of application No. 13/019,118, filed on Feb. 1, 2011, now Pat. No. 9,041,791.

(51) Int. Cl.
*H04N 9/47* (2006.01)
*H04N 5/232* (2006.01)
*G02B 21/24* (2006.01)

(52) U.S. Cl.
CPC ....... *H04N 5/23212* (2013.01); *G02B 21/244* (2013.01); *G06T 2207/10148* (2013.01)

(58) Field of Classification Search
CPC .............. H04N 5/23212; G02B 21/244; G02B 21/241; G06T 2207/10148
USPC .......................................................... 348/79
See application file for complete search history.

(56) References Cited

U.S. PATENT DOCUMENTS

| | | | |
|---|---|---|---|
| 5,396,336 A | 3/1995 | Yoshii et al. | |
| 6,341,180 B1 | 1/2002 | Pettersson et al. | |
| 6,590,612 B1 | 7/2003 | Rosenqvist et al. | |
| 6,718,053 B1 | 4/2004 | Ellis et al. | |
| 7,034,883 B1 | 4/2006 | Rosenqvist | |
| 7,468,836 B2 | 12/2008 | Maenle et al. | |

(Continued)

FOREIGN PATENT DOCUMENTS

| | | |
|---|---|---|
| CN | 101558430 | 10/2009 |
| EP | 1986046 | 10/2008 |

(Continued)

OTHER PUBLICATIONS

International Search Report and Written Opinion, Patent Cooperation Treaty, PCT application No. PCT/US2011/023374, dated Feb. 3, 2012, 13 pages.

(Continued)

*Primary Examiner* — Jared Walker

(74) *Attorney, Agent, or Firm* — Fish & Richardson P.C.

(57) ABSTRACT

The disclosure relates to methods and systems for automatically focusing multiple images of one or more objects on a substrate. The methods include obtaining, by a processor, a representative focal distance for a first location on the substrate based on a set of focal distances at known locations on the substrate. The methods also include acquiring, by an image acquisition device, a set of at least two images of the first location. The images are each acquired using a different focal distance at an offset from the representative focal distance. The methods further include estimating, by a processor, an ideal focal distance corresponding to the first location based on comparing a quality of focus for each of the images, and storing the estimated ideal focal distance and the first location in the set of focal distances at known locations.

22 Claims, 6 Drawing Sheets

(56) References Cited

U.S. PATENT DOCUMENTS

| | | |
|---|---|---|
| 7,667,890 B2 | 2/2010 | Maenle et al. |
| 7,769,219 B2 | 8/2010 | Zahniser |
| 8,067,245 B2 | 11/2011 | Van Ryper et al. |
| 2002/0172964 A1 | 11/2002 | Ippolito et al. |
| 2002/0176082 A1 | 11/2002 | Sakakibara et al. |
| 2005/0036674 A1 | 2/2005 | Be'er et al. |
| 2006/0279555 A1 | 12/2006 | Ono |
| 2007/0211460 A1 | 9/2007 | Ravkin |
| 2008/0013812 A1 | 1/2008 | Maenle et al. |
| 2008/0018994 A1 | 1/2008 | Maenle et al. |
| 2008/0137938 A1 | 6/2008 | Zahniser |

FOREIGN PATENT DOCUMENTS

| | | |
|---|---|---|
| JP | 2010-287986 | 12/2010 |
| WO | WO 01/33197 | 5/2001 |
| WO | WO 2002/039059 | 5/2002 |

OTHER PUBLICATIONS

International Preliminary Report on Patentability dated Aug. 15, 2013 in corresponding PCT application No. PCT/US2011/023374, 9 pages.

Office action dated Feb. 28, 2015 received in corresponding Chinese application No. 201180069643.6, 17 pages.

FAST AUTO-FOCUS IN IMAGING

CROSS-REFERENCE TO RELATED APPLICATIONS

This application is a continuation application of and claims priority to U.S. application Ser. No. 13/019,118, filed on Feb. 1, 2011.

FIELD OF THE INVENTION

The invention relates to electronic imaging systems.

BACKGROUND OF THE INVENTION

Many imaging and scanning applications acquire images in an automated fashion. The acquired images should be properly focused to facilitate meaningful analysis and interpretation. To acquire a properly focused image, a focal distance, for example a focal height or focal length, should be correctly determined before acquiring the image. This can be done, for example, by acquiring several images at a given location using different focal distances, and then choosing the best focused image. Acquiring multiple images can be time consuming especially in applications where a large number of images must be captured within a short time span.

An imaged object or plane can have local variations that require different focal distances for different locations on the object or plane to achieve an acceptably focused image. For example, the surface of a glass microscope slide or a biological specimen deposited thereon may not be perfectly planar and simply determining a focal plane to represent the focal distances at different locations on the entire slide does not account for such local variations. In such cases, to acquire sharp and clearly focused images, the focal distance may need to be determined for each of a plurality of locations on the slide. Fine tuning the focal distance at each location, for example by doing a full focus search, is time consuming and may not be feasible in many applications.

SUMMARY OF THE INVENTION

An imaging process for capturing images of objects on a substrate can be considerably expedited by using automated and efficient focusing methods and systems. Systems and methods employing the present invention acquire well-focused images in quick succession, typically at a plurality of locations along a substrate. The present invention is based, at least in part, on the discovery that a focal distance may be reliably estimated at each new location to be imaged based on focus data for previously imaged locations or objects instead of performing a time-consuming, full focus search at each new location. As more locations are imaged, the associated estimation errors are progressively reduced by combining previous estimates in a way that averages out such errors.

In one aspect, the present disclosure features methods for automatically focusing multiple images of one or more objects on a substrate. The methods include obtaining, by a processor, a representative focal distance for a first location on the substrate based on a set of focal distances at known locations on the substrate. The methods also include acquiring, by an image acquisition device, a set of at least two images of the first location. The images are each acquired using a different focal distance at an offset from the representative focal distance. The methods further include estimating, by a processor, an ideal focal distance corresponding to the first location based on comparing a quality of focus for each of the images, and storing the estimated ideal focal distance and the first location in the set of focal distances at known locations.

In another aspect, the present disclosure features an imaging system that includes an image acquisition device and a processor. The image acquisition device is configured to acquire a set of at least two images of a first location on a substrate using a different focal distance for each image at an offset from a representative focal distance. The processor is connected to the image acquisition device and is configured to compute the representative focal distance for the first location based on a set of focal distances at known locations on the substrate. The processor is also configured to estimate an ideal focal distance corresponding to the first location based on comparing a quality of focus for each of the images, and store the estimated ideal focal distance and the first location in the set of focal distances at known locations. The processor is further configured to provide the computed representative focal distance to the image acquisition device.

In another aspect, the present disclosure features a computer readable storage device that has encoded thereon computer readable instructions. The instructions, when executed by a processor, cause the processor to compute a representative focal distance for a first location on a substrate based on a set of focal distances at known locations on the substrate, and estimate an ideal focal distance corresponding to the first location based on comparing a quality of focus for each of the images. The instructions can further cause the processor to store the estimated ideal focal distance and the first location in the set of focal distances at known locations, and provide the computed representative focal distance to an image acquisition device. The image acquisition device is configured to acquire a set of at least two images of the first location using a different focal distance for each image at an offset from the representative focal distance.

Implementations may include one or more of the following.

The processor can retrieve the set of focal distances at known locations. The image acquisition device can acquire an additional set of at least two images of a second location, wherein the images in the additional set are each acquired using a different focal distance at an offset from a second representative focal distance calculated for the second location based on the set of known focal distances at known locations. The processor can estimate an ideal focal distance corresponding to the second location based on comparing a quality of focus for each of the images in the additional set.

The representative focal distance can be estimated as a weighted average of at least two focal distances from the set of focal distances at known locations, wherein a weight for a given focal distance is calculated based on a distance of the corresponding location from the first location. Comparing the quality of focus can include calculating, for each image, a focus score by quantifying differences between neighboring pixels. The focus score can be a Brenner focus score. Estimating the ideal focal distance can include calculating a difference between logarithms of the focus scores of the images, estimating an offset from the calculated difference, and estimating the ideal focal distance based on the offset.

At least two of the images can be acquired under illumination by a substantially same color of light, and examples of illumination colors include green, yellow, blue and red. The set of images can be acquired under illumination by at least two different colors and at least two images can be acquired under illumination by each color. Estimating the ideal focal distance corresponding to the first location can include calculating a focal distance offset for each of the different colors, determining an average focal distance offset based on the focal distance offsets calculated for the different colors, and estimating the first ideal focal distance based on the average focal distance offset.

The invention provides numerous benefits and advantages (some of which may be achieved only in some of its various aspects and implementations) including the following. In general, the invention allows for fast acquisition of images by providing a fast auto-focus process. By estimating the ideal or true focal distance at each imaged location, the disclosed systems and methods account for variations due to local irregularities on the surface of the object without compromising the speed of the imaging process. For each location, the ideal focal distance is calculated from images acquired using focal distances calculated from an initial representative focal distance. Since the representative focal distance is based on a large number of previously known and/or estimated ideal focal distances at other locations, the estimation errors are progressively minimized, thereby yielding progressively more accurate estimates of the focal distances at successive imaging locations.

With respect to imaging biological specimens, certain applications require acquisition of a large number of images in quick succession. Some applications may also require fast, possibly nearly real time, processing of the acquired images. In such cases, the imaging process can be considerably expedited by implementing methods and systems that facilitate fast and accurate auto-focusing at imaged locations. For example, in the case of imaging samples comprising blood cells, accurately focused images facilitate detection, identification, and classification of various cell types. In addition, properly focused images facilitate differentiation between normal and abnormal cells. Similarly, accurate focusing also plays a part in differentiating between mature and immature cells, fetal and maternal cells, and healthy and diseased cells. Moreover, acquiring and processing images in quick succession ensures that multiple blood samples, for example, from the same or different patients, may be handled within a given time period thereby increasing system throughput.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

The present disclosure describes fast auto-focusing in an imaging apparatus based on estimating the ideal focal distance at each imaged location instead of performing time-consuming, full-focus searches for each new location. The ideal focal distance at a given location is estimated from focus scores of multiple images acquired using focal distances at offsets from each other and from an initial representative focal distance. The representative focal distance is calculated by factoring in the knowledge of previous estimates of ideal focal distances at other locations or from one or more training sets of data. Such cumulative estimation gradually averages out the associated estimation errors and progressively yields more accurate estimates of the ideal focal distances as more locations are imaged.

Imaging Systems

Figure 1:
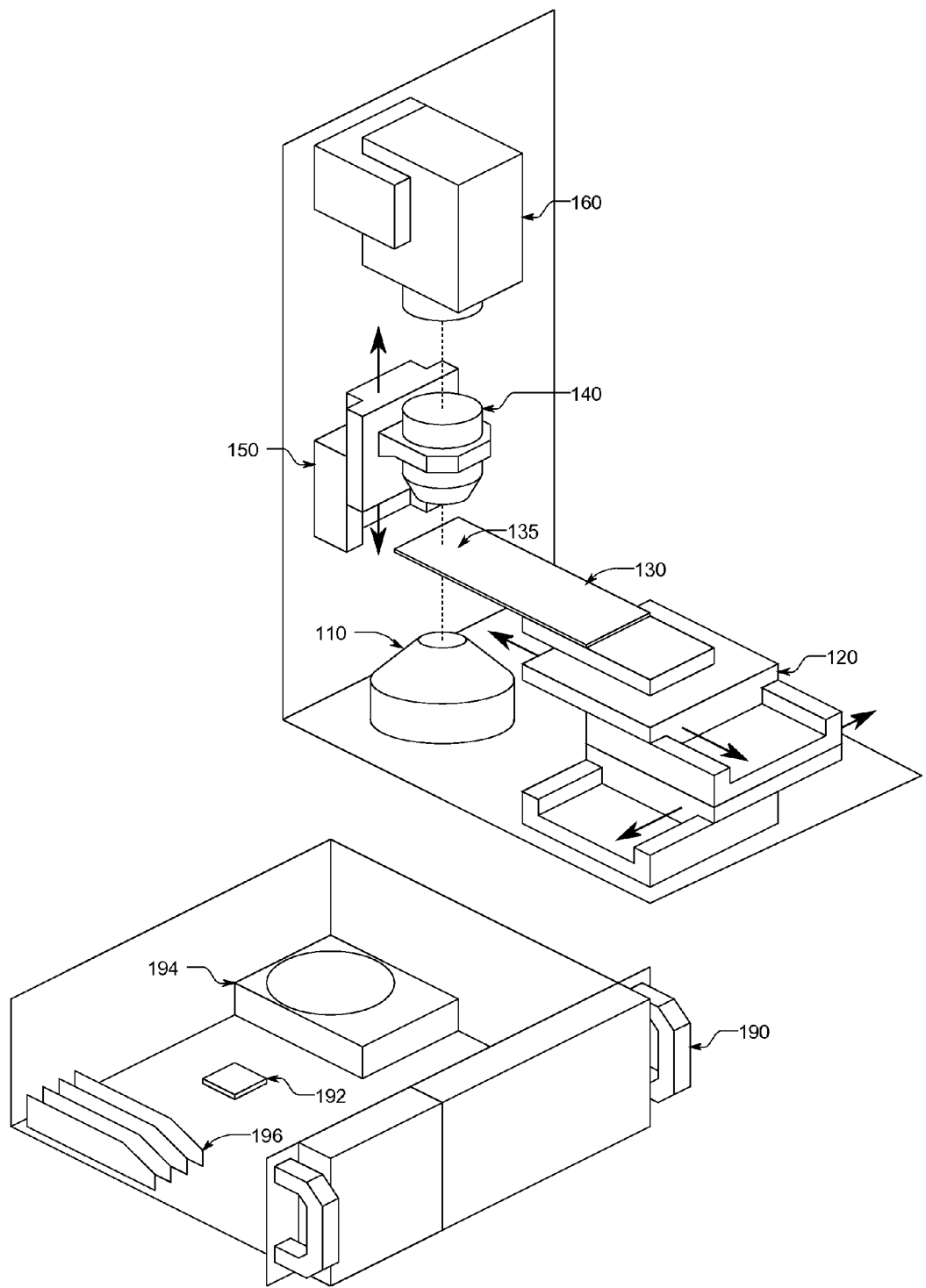
FIG. 1 is a schematic diagram of an embodiment of an imaging system implementing a fast auto-focus method described herein.

FIG. 1 shows one embodiment of an imaging system 100 that employs the fast auto-focusing methods described herein. Imaging system 100 includes imaging hardware 105 that is controlled by a computer 190. The computer 190 generally includes a central processing unit 192, a hard drive 194, and random access memory 196.

In the imaging system shown in FIG. 1, a light source 110 illuminates a slide 130 comprising a biological specimen 135. The slide is mounted on a first motorized stage 120 capable of moving in a horizontal plane (parallel to the surface of the slide that is imaged) such that any part of the slide 130 can be positioned under an objective lens 140. A second motorized stage 150 moves the objective lens 140 up and down to facilitate focusing on the specimen 135 deposited on slide 130. The distance between the slide 130 and the objective lens 140 is referred to as the "focal distance." A reduction in focal distance implies, in this example, moving the objective lens 140 vertically towards the slide 130. Alternatively, the focal distance can also be adjusted by moving the slide 130 (for example by moving the first motorized stage 120) vertically towards the objective lens 140. In some implementations, both the slide 120 and the objective lens 140 can move to facilitate adjusting the focal distance. The axes, with respect to which the first motorized stage 120 is moved in a horizontal plane, are typically referred to at the X and Y axes. The vertical axis along which the second motorized stage 150 moves the objective lens 140 is typically referred to as the Z axis. The three axes define a coordinate system that the system 100 utilizes to image any (x, y, z) point in space relative to the slide 130.

Light from the source 110 passes through the slide 130 and is projected by the objective lens 140 onto the sensor of the camera 160. The sensor may, for example, be a charge-coupled device (CCD) array. FIG. 1 depicts an example of "bright field" microscopy where objects on the slide are visible because they absorb light and are therefore darker in the image produced by the camera. The imaging hardware 105 can include one or more additional lenses. Other microscopic modes such as fluorescence, dark-field, or phase contrast can also generate images to which the fast auto-focus methods described herein can be applied.

If an image is acquired at a non-optimal focal distance, the image is blurry and typically unsuitable for many image processing applications. If the surface of the slide 130 were perfectly planar, the system 100 could acquire in-focus images simply by determining the proper z height corresponding to an in-focus image at three (x, y) locations and then fitting a plane to those (x, y, z) points. The plane equation would then provide an in-focus z height for any other (x, y) location on the slide. In practice, however, the focal distance for a given location may not be accurately determined from a plane fit as described above due to irregularities in the surface of the slide 130 and/or the stage 120. Therefore, in general, the focal distance may need to be adjusted slightly for each image that is acquired at a different (x, y) location on the slide.

After image acquisition, camera 160 sends images to the computer 190 for processing. If the images are processed quickly enough, focal distance data from one image location may be used to adjust the focal distance at the next location for capturing an image. This allows the system to adjust to variations in focal distances corresponding to different locations and, in turn, produce more accurately focused images for display. For example, if one region of the slide 130 is slightly thicker than others and ten locations are imaged within that region, the change in thickness can be discovered after the first image is acquired and additional images taken at other locations within the region can be acquired at slightly adjusted focal distances to compensate for the change in thickness using the methods described herein.

Fast Auto-Focusing Methods

Figure 2:
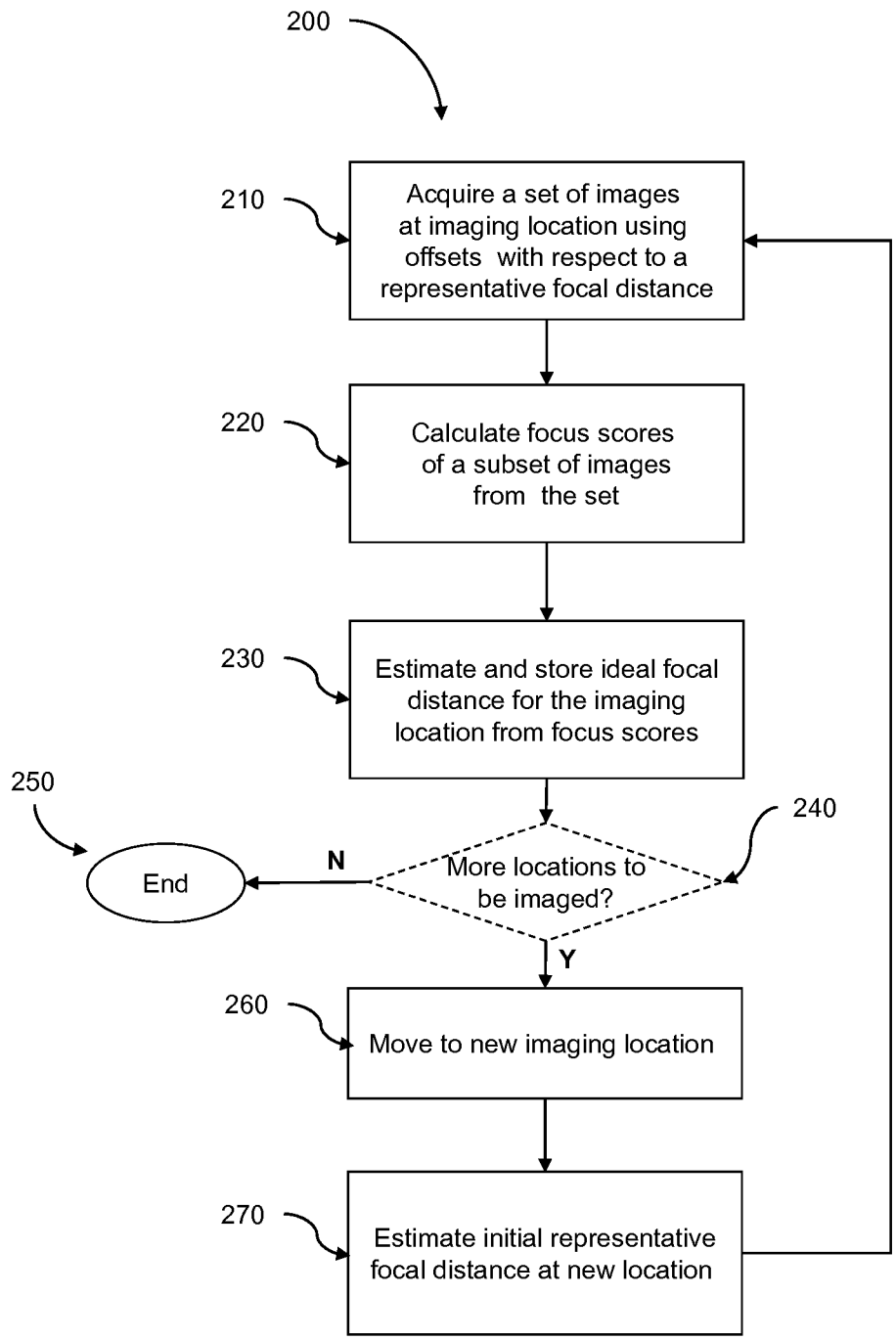
FIG. 2 is a flow diagram depicting an embodiment of a sequence of operations for estimating ideal focal distances.

FIG. 2 is a flow chart 200 depicting a general method of auto-focusing that includes a sequence of operations performed by a system for estimating ideal focal distances at different imaging locations on a substrate such as a microscope slide. Operations include acquiring a set of images at an imaging location using focal distances (step 210) at predetermined offsets from a representative focal distance and calculating focus scores for all or a subset of images from the set (step 220). Operations also include estimating and storing an ideal focal distance for the imaging location from the calculated focus scores (step 230), checking whether the system needs to image additional locations on the substrate (step 240), and upon such determination, moving the objective and/or stage hardware to the new imaging location (step 260). The representative focal distance for the new location is estimated as a weighted average of estimated ideal focal distances stored from previous imaging locations (step 270). The system repeats these steps for the new imaging location, and continues this process until the system has acquired images of all the locations and/or objects of interest located on slide 130. These steps are described below in further detail.

Acquisition of Images

The set of images acquired in step 210 can be referred to as a "stack" of images. Acquiring the set or stack of images can include acquiring a first image and at least a second image of a portion of the target or (x, y) location on the imaging plane at a different focal distance from the first image. The focal distances for the different images within a stack can be determined as offsets with respect to a representative focal distance for the stack as a whole. In certain embodiments, the representative focal distance corresponding to the stack is specified with respect to a predetermined point in the stack, and the focal distances of the individual images within the stack are calculated as relative offsets with respect to such a predetermined point. For example, for a four-image stack where the corresponding focal distances are equally spaced from one another, the representative focal distance for the stack can correspond to the midpoint between the second and third images from the top of the stack. Other conventions for specifying the representative focal distance of the stack are also possible for practicing the invention. For example, the representative focal distance for a stack can correspond to the focal distance corresponding to a particular image in the stack.

Different stacks typically correspond to different imaging locations and can include the same number of images from location to location. Further, it is possible to pre-program components of a system to acquire the stack of images such that an entire stack of images is acquired in response to a single command from a computer. Such pre-programming, either using hardware or software, can reduce latency as compared to the case of providing a separate command for each image.

Images in a stack can be acquired under different colored illumination. For example, some images in a stack can be acquired under illumination by blue light and other images can be acquired under illumination by yellow, green, or red light. Illuminating a specimen with different colors of light can result in different information being extracted from the acquired images. For example, in the case of imaging a specimen containing blood cells, cells may appear differently under different colored illumination, thereby facilitating easier identification, classification, or differentiation. For example, red blood cells absorb significant amounts of blue light due to the presence of hemoglobin, and cell nuclei stained with standard Romanowsky stains absorb yellow light.

Each stack can have more than one image, at a relative focal offset, acquired under illumination by a given color of light as well as sets of images acquired under illumination by different colored lights. For example, a stack can have two images each acquired under illumination by one or more of blue, green, red, and yellow light. The relative focal offsets between the images acquired under the same or different colors can depend on other parameters such as resolution. For example, for low resolution (or low magnification) images of blood cells, the focal offset between two images acquired under the same type or wavelength of illumination can be about 1 to 10 microns, e.g., 2, 4, 5, 6, or 7 microns, whereas the offset can be as little as 0.1 to 1.0 microns, e.g., 0.4, 0.5, 0.6, 0.7, or 0.8 microns, for high resolution images.

As further described below, when the estimates for ideal focal distances at a plurality of locations on a substrate are known, the representative focal distance for a new imaging location can be determined as a weighted average of the known or estimated ideal focal distances for previously-imaged locations. However, when the first stack is (or the first few stacks are) acquired, sufficient focal distance information may not be available for other locations on the substrate. In such cases, the system can first image multiple locations on the slide to determine the degree of tilt in the slide plane surface. This can be done, for example, by determining the actual focal distances (e.g., by a fine tuning process) at three or more locations on the slide and fitting a plane through the determined points to estimate a tilt of the focal plane. The effect of the tilt may be accounted for or corrected throughout imaging various locations in the plane, and the initial representative focal distance may be calculated based on the tilt measurement.

Calculation of Focus Scores

Operations also include calculating focus scores for all or a subset of images from the acquired set or stack (step 220). A focus score for an image represents a deviation of a representative focal distance from an ideal or true focal distance for a given point on the imaging plane. Therefore, in some implementations, it is possible to estimate the ideal focal distance based on the calculated focus scores from a plurality of images. Focus scores can be calculated using functions that quantitatively assess a quality of focus for a given image. If a focus score for each acquired image is calculated using one such "auto-focus function," then a focal distance corresponding to the highest scoring image can be selected as the ideal focal distance. Certain auto-focus functions operate based on image differentiation, i.e., quantifying differences between neighboring pixels. In general, images that are blurry due to poor focus will have smaller differences between adjacent pixels, while sharply focused images will have higher difference between adjacent pixels.

Different types of image differentiation functions are used to measure relative focus qualities in images. For example, a Brenner score can be used to measure the quality of focus in an image. Calculation of Brenner score is described, for example, in the publication Brenner et al., "An Automated Microscope for Cytological Research," J. Histochem. Cytochem., 24:100-111 (1971); incorporated herein by reference in its entirety.

The Brenner score is a measure of the texture in the image. An in-focus image has a high Brenner score, and has texture at a smaller scale than an out-of-focus image. Conversely, an out-of-focus image has a low Brenner score, and has less small-scale texture than an in-focus image. The variation of Brenner scores with focal distances can be represented using a Brenner function experimentally plotted by acquiring several images at different focal distances and plotting their Brenner scores as a function of the focal distance. The Brenner function has a peak value at the ideal focal distance and decreases as the focal distance is changed in either direction from the ideal focal distance. Therefore, in general, the Brenner function starts out at a low value when the image is acquired at below the ideal focal distance, reaches a peak value when the image comes into focus at the ideal focal distance, and decreases as the focal distance increases above the ideal focal distance.

Figure 3:
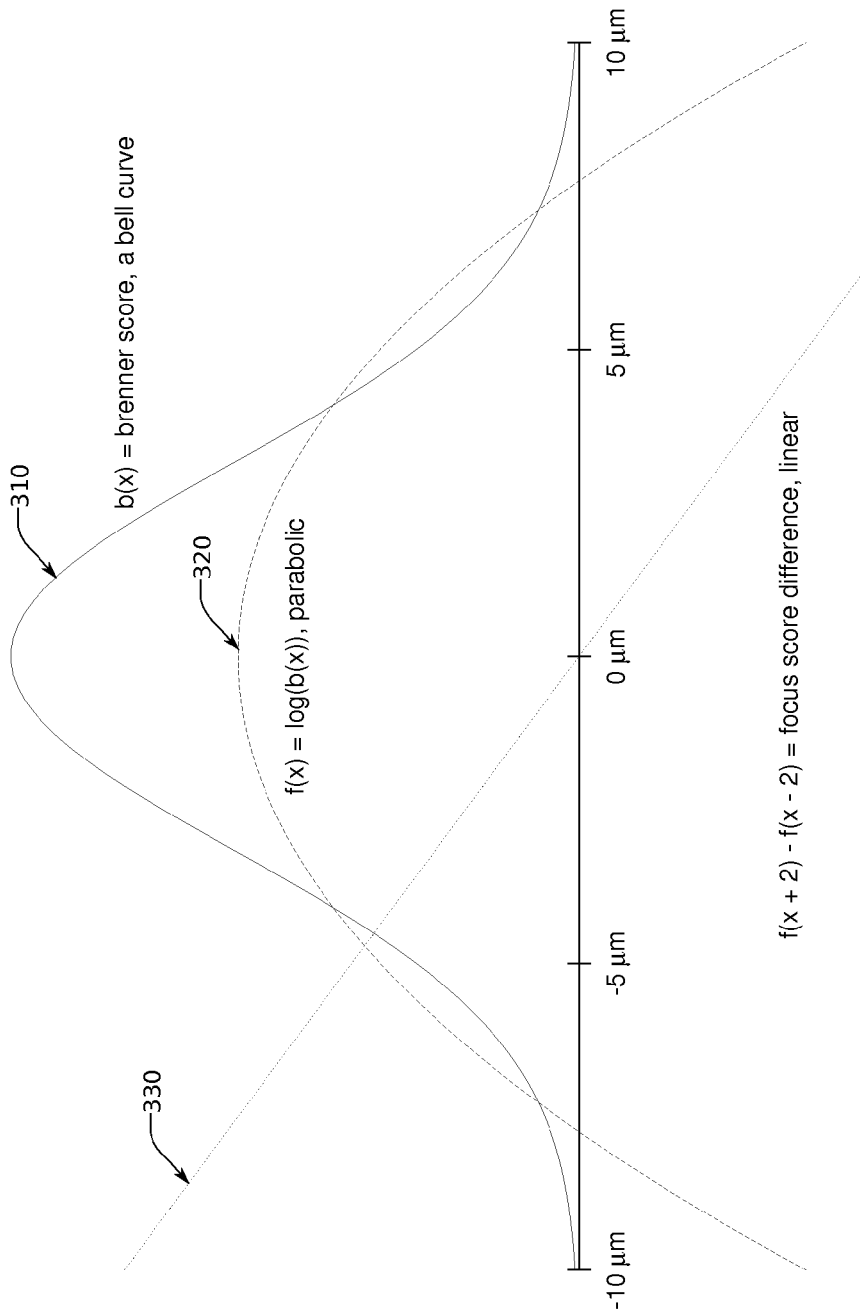
FIG. 3 is a set of plots illustrating examples of functions used as focus scores.

Curve 310 in FIG. 3 depicts an exemplary Brenner function, which shows the bell-shaped nature of the function. The focal point is taken as the reference point (0 μm) and is identified by the peak of the bell shaped curve. In this example, the Brenner function is symmetric around the focal point and diminishes to almost zero at about 10 μm in either direction from the focal point.

The Brenner score can be calculated by measuring the average change in gray level between pairs of points separated by a given number of pixels. For example, the Brenner score (B) for a given image can be calculated using the following equation:

$$B = \sum_{i=1}^{R} \sum_{j=1}^{C-n} [P_{i,j} - P_{i,j+n}]^2 \quad (1)$$

where R and C are the number of rows and columns of pixels in the image and $P_{i,j}$ is the value of a pixel in row i and column j. The value of n can be chosen experimentally, for example, depending on the resolution and magnification of the optics, as well as pixel size of the camera. For example, n may be the smallest distance that the optical system can resolve.

Any image acquired by a sensor contains some noise in the pixel values, for example, due to variations in number of photons impinging pixel locations, or noise in the electronics associated with the sensor. Such noise can cause two pixel values in a given image to differ even if the two pixels represent the same intensity level of an image. The effect of such noise can be reduced by thresholding the terms considered in the summation to calculate the Brenner score. For example, the squared difference between two neighboring pixels can be added to the summation for the Brenner score only if the difference is higher than a predetermined threshold. An example of such a thresholding process is described in the following pseudo code:

```
initialize B = 0;
for i = 1 to R
  for j = 1 to C-n
    if [P_{i,j} - P_{i,j+n}] ≥ T
      B = B + [ P_{i,j} - P_{i,j+n}]^2
  end;
end;
``` where B represents a Brenner score, $P_{i,j}$ represents a pixel value for a pixel in the i th row and j th column, R and C represent the number of rows and columns, respectively, and T represents a threshold. As described in the pseudo code above, only if the difference in intensity values between two pixels separated by n pixels exceeds the threshold T, the difference is squared and added to the most current value of the Brenner score. The Brenner score for a given image, therefore, is calculated by aggregating such differences over the entire image.

Estimation of Ideal Focal Distances

Referring again to FIG. 2, operations further include estimating and storing an ideal focal distance for a given location based on the calculated focus scores (step 230). In some embodiments, functions derived from the Brenner score are used for estimating the ideal focal distances from calculated focus scores. In addition, differences in logarithms of Brenner scores can be used to estimate an ideal focal distance.

The logarithm of a Brenner function can be represented as a parabola. Curve 320 depicted in FIG. 3 shows an example of such a parabola. Estimating an ideal focal distance from a given set of focus scores can include fitting a parabola to the logarithm of the focus scores as a function of the focal distance. As the general shape of the parabola is known, by way of example and using the curve 320 in FIG. 3, the parabola can be mathematically represented using the equation:

$$y = Ax^2 + Bx + C \quad (4)$$

wherein y=ƒ(x)=log(b(x)) represents the logarithm of Brenner scores, and A, B, and C represent constants that govern the shape and position of the parabola on the X-Y plane. Three equations are therefore required to solve for A, B, and C. The peak value $y_{max}$ (or the value at the vertex) for the parabola can be pre-programmed into a curve fitting algorithm. The peak value can be determined based on experimental data and provides a first equation to solve for the parameters A, B, and C. Two other equations are realized using the logarithm of Brenner scores calculated for two different images. The parameters A, B, and C can be determined from the three equations thereby yielding a complete description of the parabola. The focal distance corresponding to peak of the parabola is then used as an estimate of the ideal focal distance.

Other ways of fitting a parabola on calculated focus scores are also within the scope of the description. For example, any one of the parameters A, B, or C can be fixed based on historical or experimental data. Equation (4) can therefore be reduced to have two unknown parameters that can be solved for using the calculated Brenner scores for two different images. Where three images are acquired for a given illumination color instead of two, three equations can be realized from the corresponding calculated focus scores and the parameters A, B, and C can be solved for from the equations. In some applications, this may be more accurate than an estimate based on only two points, but requires acquisition and processing of an additional image. Other focus score functions to which an equation can be fit can also be used for estimating ideal focal distances without deviating from the scope of this disclosure.

With respect to an embodiment utilizing Brenner scores, the difference between the logarithms of Brenner scores for a pair of images taken at a fixed focal offset to each other is a linear function (curve 330, in the example shown in FIG. 3) whose value is substantially proportional to a deviation or offset from the ideal focal distance represented by the peak of the Brenner function. Accordingly, the estimated ideal focal distance offsets for images acquired under a given illumination are calculated assuming a known difference ($\Delta f$) in focal distance per unit difference in the logarithm of the Brenner scores. Such an assumption can be derived, for example, from the slope of a linear curve such as curve 330 shown in FIG. 3. The offset can then be calculated as:

$$\text{offset} = \text{difference} \cdot \left( \frac{\Delta f}{\delta} \right) \quad (5)$$

where $\Delta f$ is the difference in focal distance per unit difference in the logarithm of the Brenner scores and $\delta$ is the Z separation between the pair of images. The estimated offset of the stack of images as a whole can be calculated as the average of the offsets for all four colors. The ideal focal distance for the location is stored after adding the average offset to the representative focal distance used to acquire the stack. It should be noted that whether a calculated offset is added or subtracted from a representative focal distance depends on a sign convention followed in a particular application.

Once an ideal focal distance is estimated for a given location, the estimated ideal distance is stored in a memory location (for example in a database) linked with the corresponding location on the substrate. The stored value can then be used in calculation of a representative focal distance for an image stack at a subsequent imaging location as described below.

Two or more images of a same location or object can be used to evaluate focus scores over which a curve is fitted to estimate the ideal focal distance. For example, multiple images can be acquired at different focal distances and a bell curve equation fitted to the focus scores from these multiple images. The peak of the bell curve can be interpolated from the focus scores. The images and corresponding focus scores can be gathered at relatively larger focal offsets (e.g., 4 µm), but the ideal focal distance can be estimated at a much finer resolution.

Estimation of a Representative Focal Distance at a New Location

Operations may include checking if the imaging system needs to acquire additional images at other locations on a given substrate (step 240) and proceeding with the imaging process accordingly. If no further locations are remaining, the imaging process can be terminated (step 250) for a given object and restarted for a new object, e.g., a different slide containing a different biological specimen. Conversely, if more locations are to be imaged, the imaging hardware can move to a new imaging location (step 260). The locations to be imaged can be pre-programmed into a control module that controls the imaging hardware.

Figure 4:
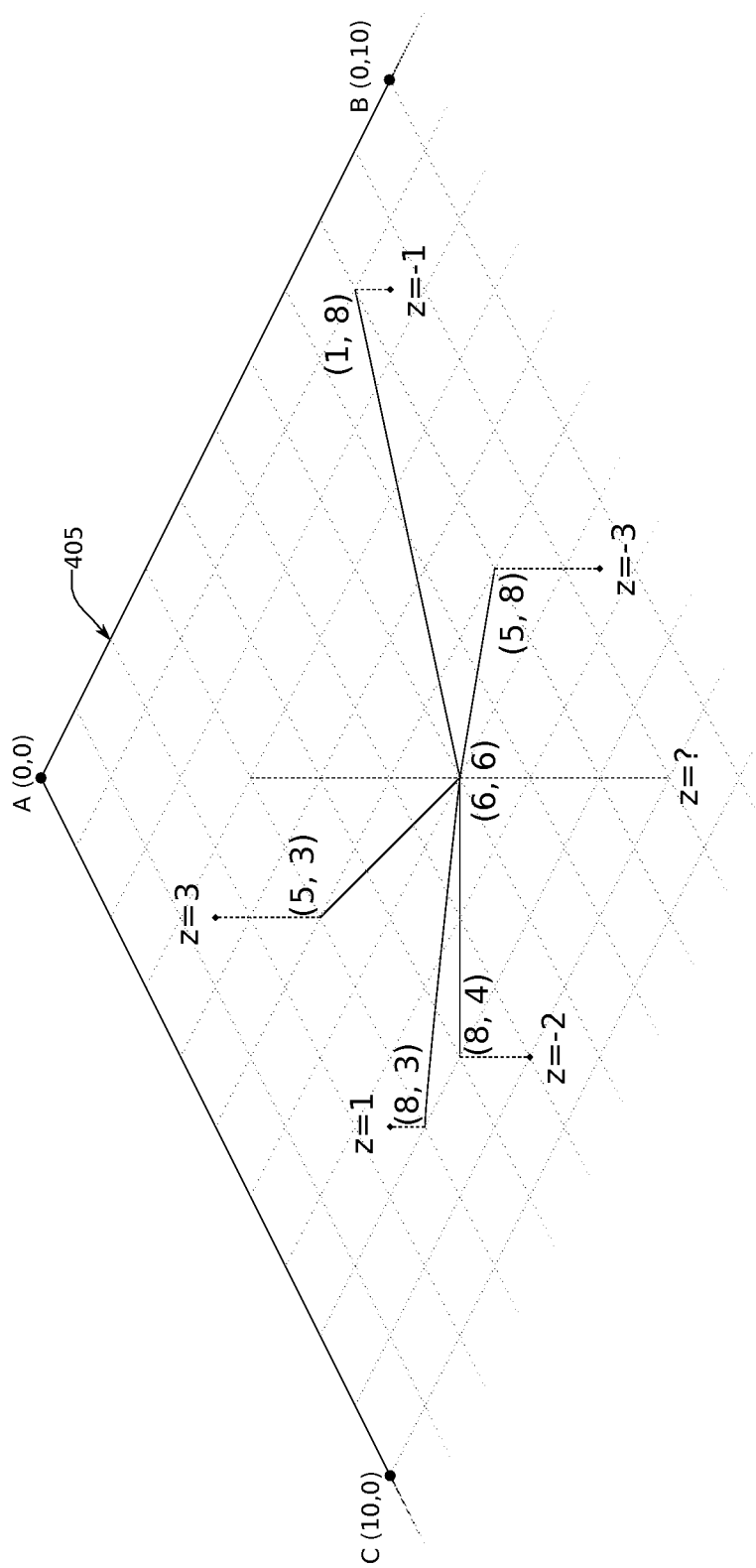
FIG. 4 is a plot depicting embodiments of weighting functions.

Operations further include estimating an initial representative focal distance at the new location (step 270). The representative focal distance can be estimated or calculated as a weighted average of estimated ideal focal distances known for other locations. In such a calculation, a known estimated ideal focal distance can be assigned a weight based on a weighting function determined, for example, based on a distance of the previously-imaged location from the new imaging location. An example of the representative focal distance estimation is illustrated in FIG. 4. In this figure, several locations on an imaging plane 405 are represented as (x, y) coordinate pairs and the corresponding estimated ideal focal distances at the locations are represented using a z value. For example, the ideal focal distance at the location (5, 3) in this example was estimated as z=3. Similarly, the ideal focal distances at locations (1, 8), (5, 8), (8, 4), and (8, 3) were estimated as z=−1, z=−3, z=−2, and z=1, respectively. The estimated ideal focal distances were then used to estimate the representative focal distance at a new imaging location represented by the point (6, 6).

In general, the weighted averaging assigns higher weights to estimated ideal focal distances from locations closest to the most current imaging location and lower weights to focal distances for image locations further from the current imaging location. The weighting function can be linear or a function of one or more parameters. In some embodiments, the weights assigned to an estimated (or known) ideal focal distance at a given location are calculated as:

$$\text{weight} = (d^2 + n^2)^{-(s/2)} \quad (6)$$

where the parameter d is the distance of the given location from the most current location, the parameter n, representing a neighborhood, controls a horizontal scale of the weighting function, and the parameter s, representing sharpness, controls the shape of a curve corresponding to the weighting function. In the current example, the (x, y) distances were calculated in millimeter scale. Therefore, assuming a neighborhood of 1000 µm (i.e., n=1000 µm) and a sharpness of 4 (i.e., s=4), the weights in this example were calculated using the equation:

$$\text{weight} = (d^2 + 1)^{(-2)} \quad (7)$$

The calculation of the representative focal distance in the above example for a new imaging location (6, 6) is illustrated in Table 1:

TABLE 1

Example showing calculation of representative focal distance

| x (mm) | y (mm) | Estimated ideal focal distance z (µm) | $d^2$ | weight | weight * z |
|---|---|---|---|---|---|
| 5 | 3 | 3 | 10 | 0.008 | 0.025 |
| 8 | 3 | 1 | 13 | 0.005 | 0.005 |
| 8 | 4 | −2 | 8 | 0.012 | −0.025 |
| 5 | 8 | −3 | 5 | 0.028 | −0.083 |
| 1 | 8 | −1 | 29 | 0.001 | −0.001 |
| | | Sum: | | 0.055 | −0.079 |
| | | Weighted average of z: | | | −1.451µm |

As illustrated above, the representative focal distance at the location (6, 6) was estimated to be −1.451 micron. The representative focal distance, in general, is different from the true focal distance or estimated ideal focal distance for a previously imaged location. For example, an estimation of the ideal focal distance at the location (6, 6) can turn out to be 1 micron. The ideal estimated focal distance, and not the representative focal distance, is stored for a given location and used in estimating the representative focal distance at one or more new imaging locations. By cumulatively averaging the previous estimates of ideal focal distances from multiple locations, errors in the estimates can be smoothed, thereby resulting in progressively better estimates of focal distances at new imaging locations.

Weighted averaging of estimated ideal focal distances to estimate the focal distance at a given location can also result in a progressively more accurate estimate of the slope of a fitted parabola at a given location. The slope of the parabola is usually dependent on one or more parameters of the imaged field. For example, in the case of imaging slides containing a sample of stained blood cells, the slope can depend on the darkness and density of the cells.

Figure 5:
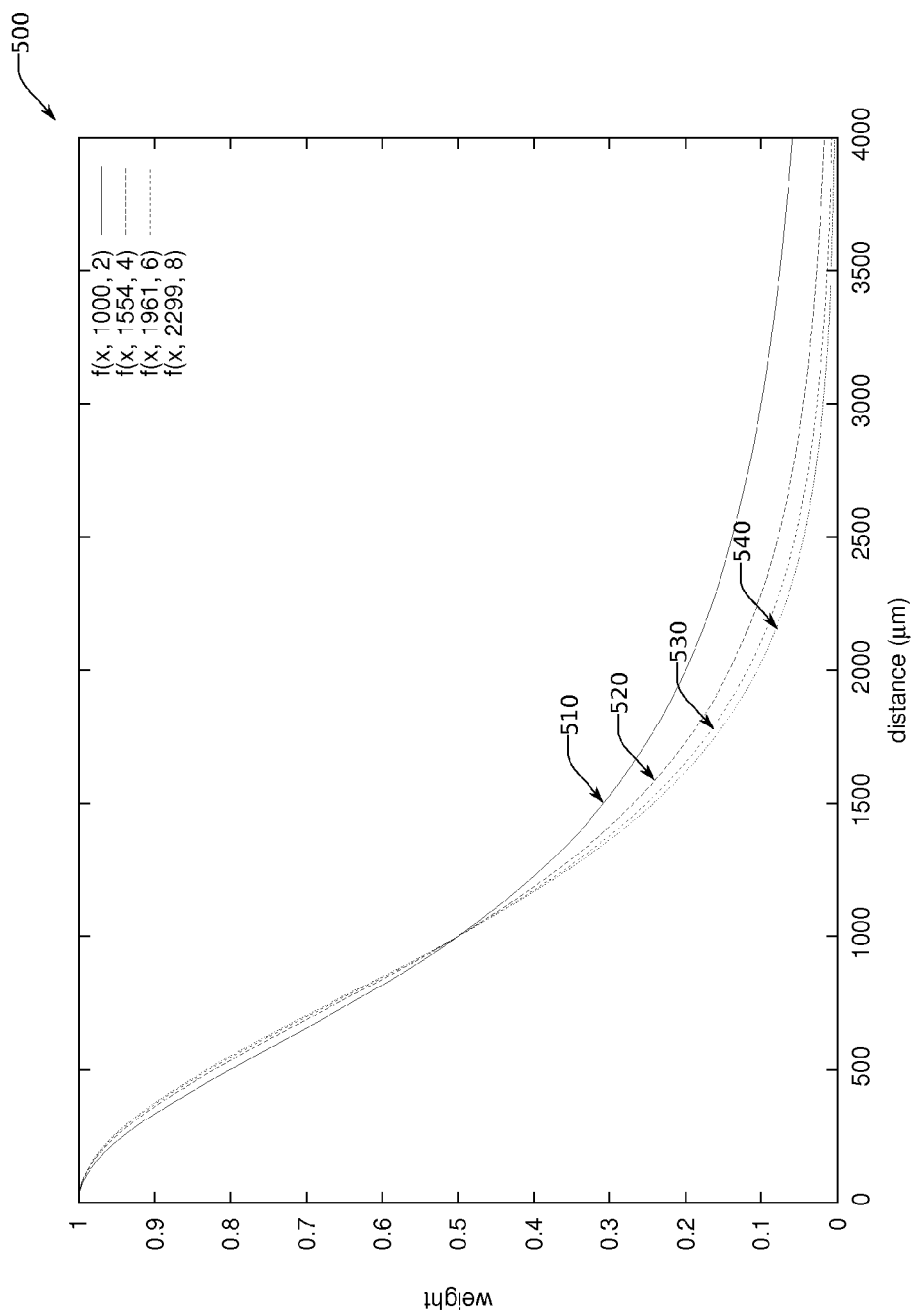
FIG. 5 is a graphical representation of estimated focal distances on a plane.

Referring to FIG. 5, plot 500 shows examples of curves $f(x, n, s)$ illustrating how the shape of the weighting functions $f(x)$ vary with the parameters n and s, based on equation (6). For example, curve 510 represents a weighting function for n=1000 µm and s=2. Curve 520 represents a weighting function for n=1554 µm and s=4. Curve 530 represents a weighting function for n=1961 µm and s=6 and curve 540 represents a weighting function for n=2299 µm and s=8. In some implementations, a suitable weighting function is determined experimentally via manipulation of the parameters n and s. Other weighting functions with or without additional or lesser parameters are also within the scope of this disclosure.

Overview of a Computing System

Figure 6:
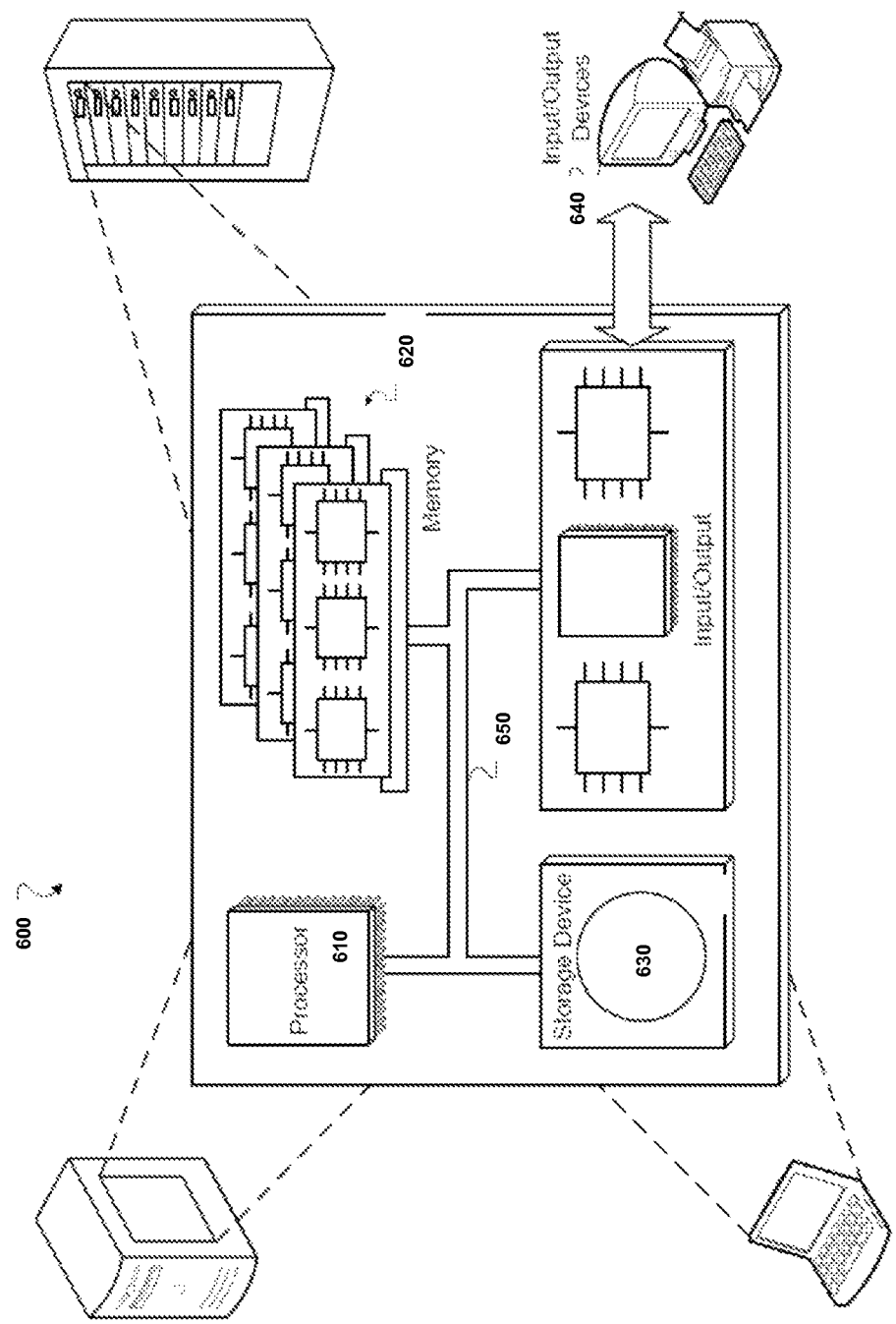
FIG. 6 is a schematic diagram of a computing device and system.

FIG. 6 is a schematic diagram of a computer system 600 that can be used to control the operations described in association with any of the computer-implemented methods described herein, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 can include volatile memory and/or non-volatile memory.

The storage device 630 is capable of providing mass storage for the system 600. In general, the storage device 630 can include any non-transitory tangible media configured to store computer readable instructions. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, or in combinations of them. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Various software architectures can be used for implementing the methods and systems described in this application. For example, a publish/subscribe messaging pattern can be used in implementing the methods and systems described herein. In the case of publish/subscribe messaging, the system includes several hardware and software modules that communicate only via a messaging module. Each module can be configured to perform a specific function. For example, the system can include one or more of a hardware module, a camera module, and a focus module. The hardware module can send commands to the imaging hardware implementing the fast auto-focus, which in turn triggers a camera to acquire images.

A camera module can receive images from the camera and determine camera parameters such as shutter time or focus. Images can also be buffered in the computer's memory before being processed by the camera module. When performing the initial search for the tilt of the slide, the camera module can also send a message interrupting the hardware module when it has seen enough images to determine the proper shutter time or focus.

The system can also include a focus module that can be implemented as software, hardware or a combination of software and hardware. In some implementations, the focus module examines all the frames in a stack and estimates how far the stack is from the ideal or ideal focal distance. The focus module can also be responsible for assigning a focus score to each frame in a stack of images.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks;

magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Alternatively, the computer can have no keyboard, mouse, or monitor attached and can be controlled remotely by another computer The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The processor 610 carries out instructions related to a computer program. The processor 610 can include hardware such as logic gates, adders, multipliers and counters. The processor 610 can further include a separate arithmetic logic unit (ALU) that performs arithmetic and logical operations.

Example

The following example describes an application of the present invention for imaging a biological specimen comprising blood cells using the system 100 described in connection with FIG. 1. The following example, which is a continuation of the example described above in connection to FIG. 4, is for illustrative purposes only, and does not limit the scope of the invention described in the claims.

An automated sample preparation system, for example, an embodiment of the system disclosed in co-pending U.S. application Ser. No. 12/430,885, prepared a biological specimen for imaging by depositing a thin monolayer of blood cells on the slide 130. Thereafter, an embodiment of the system disclosed in co-pending U.S. application Ser. No. 12/943,687 fixed, stained, rinsed and dried the specimen on slide 130. This process included staining the cells with Methylene Blue and Azure B. However, the methods disclosed in this document and in the following example can also be used when imaging specimens are prepared using other Romanowsky stains or other stains and/or dyes. An automated transport mechanism of system 100 (not shown) then loaded slide 130 onto the first motorized stage 120.

Before imaging cells deposited on the slide 130 and as further described below, the system 100 determined the degree of tilt of the slide 130 as loaded onto the stage 120. The computer 190 measured focus scores at three distinct (x, y) locations on the slide 130 by issuing commands to move the stage 120 in the x and y directions and the objective lens 140 in the z direction using the second motorized stage 150. At each of the three locations, the computer 190 caused the imaging hardware to capture multiple images of slide 130 at different focal distances and search for a peak in the focus score using a Brenner focus function. These three distinct (x, y) locations on slide 130 are marked as A (0,0), B (0, 10), and C (10,0) in FIG. 4. The focal distance corresponding to the peak focus score at each of the three locations was used to provide a preliminary estimate of the focal plane of the slide 130. The computer 190 determined that the peak focus score for each of locations A, B, and C corresponded to the following stage coordinates listed in Table 2:

TABLE 2

Example showing calculation of representative focal distance

| Location | X | Y | Z |
|---|---|---|---|
| A | 0 | 0 | 0.5 |
| B | 0 | 10 | −0.5 |
| C | 10 | 0 | 2.5 |

Using the stage coordinates for the each of the peak focus score locations on the slide 130, the computer 190 calculated the focal plane for the slide 130 as being represented by the following equation:

$$z=0.2x-0.1y+0.5 \qquad (8)$$

After calculating the focal plane for the slide 130, the system 100 initiated a series of image capture steps for the slide 130 at several (x, y) locations containing cells of interest. At the first new (x, y) location (5, 3) and for four additional (x, y) locations on slide 130 listed above in Table 1, camera 160 acquired an 8-image stack of a cell of interest. Specifically, the camera acquired an image at each of four colors of illumination (i.e., 635, 598, 525, and 415 nm) at a first focal distance corresponding to the focal plane calculated for slide 130. Next, the motorized stage 150 changed the focal distance by 0.7 microns, and camera 160 acquired another four images at the same (x, y) location (5, 3), one image for each of the four illumination colors. As described in connection with equation 5, the computer 190 used the ideal focal distance offset calculation to estimate the ideal focal distance for each of locations (5, 3); (8, 3); (8, 4); (5, 8); and (1, 8) as shown in Table 1.

At the next location to be imaged (6, 6), the computer 190 calculated a representative focal distance of −1.451 microns utilizing the weights calculated using equation 7 for location (6, 6) based on the estimated ideal focal distances corresponding to five previously imaged locations on the slide 130 as shown in Table 1. In contrast, the z height at location (6, 6) calculated using equation 8 was z=1.1.

Accordingly, the computer 190 determined that the z stage coordinate for the center of the 8-image stack at (x, y) stage coordinates (6, 6) was −0.351 based on the focal plane z value of 1.1 and the representative focal distance relative to the focal plane of −1.451, i.e., z=1.1+(−1.451)=−0.351 micron. Computer 190 commanded the imaging hardware 105 to acquire two sets of four images at location (6, 6). The imaging hardware captured two sets of four images at different colored illumination at first and second z locations ±0.35 microns relative to the center of the image stack.

Relative to the focal plane, z=−1.101 for the first four images and z=−1.801 for the second four images at location (6, 6).

Using the focus scores from the eight image stack acquired at location (6, 6), computer 190 calculated an estimated ideal focal distance for the location as shown in the following table.

TABLE 3

Example of ideal focal distance estimation for an 8 image stack

| Color | Focal distance | Logarithm of Brenner score | Difference | Estimated ideal focal distance offset |
|---|---|---|---|---|
| Red | −0.35 micron | 18.7 | 0.4 | 1.143 micron |
|  | 0.35 micron | 19.1 |  |  |
| Yellow | −0.35 micron | 19.5 | 0.1 | 0.286 micron |
|  | 0.35 micron | 19.6 |  |  |
| Green | −0.35 micron | 20.4 | 0.3 | 0.857 micron |
|  | 0.35 micron | 20.7 |  |  |
| Blue | −0.35 micron | 17.3 | −0.2 | −0.571 micron |
|  | 0.35 micron | 17.1 |  |  |
|  |  |  | Average: | 0.429 micron |

The difference in focal distance per unit difference in the logarithm of the Brenner scores was taken as 2 micron. The focal distances for the pairs of images for each color were separated by 0.7 micron, and computer 190 calculated the estimated ideal focal distance offsets using equation 5. Thus, computer 190 determined that the focal distance for the acquired stack at location (1, 1) was 0.429 microns below the ideal focal distance as shown in Table 3. Accordingly, the computer 190 applied the offset value to the representative focal distance to derive an estimated ideal focal distance for location (6, 6) as follows: 0.429+(−1.451)=−1.022 micron. This estimated ideal focal distance was then added to Table 1 and used when computer 190 calculated a representative focal distance for the next (x, y) location to be imaged on slide 130.

In turn, the computer 190 continued to calculate a representative focal distance and an estimated ideal focal distance for each new (x, y) location imaged after the location (6, 6). The system 100 completed this process until the system 100 obtained image stacks for all cells of interest on the slide 130. Upon receipt of a stack of images from a new (x, y) location, the computer 190 analyzed the images and updated the model of the focal plane by the time imaging hardware 105 presented the next cell of interest to the camera 160. As the system imaged additional locations along slide 130, the model became progressively more accurate at estimating focal distances while accounting for local variations on the surface of the slide 130. This allowed images to be acquired as quickly as if a simple plane fit was being used, but with improved focus measurements.

OTHER EMBODIMENTS

The inventions described herein can be implemented in many ways. Some useful implementations are described above. The descriptions of implementations are not descriptions of the inventions, which are not limited to the detailed implementations described herein, but are described in broader terms in the claims. It is to be understood that while the invention has been described in conjunction with the detailed description thereof, the foregoing description is intended to illustrate and not limit the scope of the invention, which is defined by the scope of the appended claims. The methods and systems described herein can be used for achieving fast auto-focus in other imaging systems, for example, in various medical imaging applications and fast-focus photography. Any imaging system that requires fast in-line estimation of focal distance is within the scope of this application. Other aspects, advantages, and modifications are within the scope of the following claims.

What is claimed is:

1. A method for automatically focusing multiple images of one or more objects on a substrate, the method comprising:
   a) obtaining, by a processor, a representative focal distance for a first location on the substrate based on a set of focal distances at known locations on the substrate, wherein the representative focal distance is estimated as a weighted average of at least two focal distances from the set of focal distances at known locations, wherein a weight for a given focal distance is calculated based on a distance of the corresponding location from the first location;
   b) acquiring, by an image acquisition device, a set of images of the first location based on the representative focal distance;
   c) estimating, by a processor, an ideal focal distance corresponding to the first location based on the acquired set of images; and
   d) storing the estimated ideal focal distance and the first location in the set of focal distances at known locations.

2. The method of claim 1, further comprising:
   retrieving, by a processor, the set of focal distances at known locations;
   acquiring, by the image acquisition device, an additional set of at least two images of a second location, wherein the images in the additional set are each acquired using a different focal distance at an offset from a second representative focal distance calculated for the second location based on the set of known focal distances at known locations; and
   estimating, by a processor, an ideal focal distance corresponding to the second location based on comparing a quality of focus for each of the images in the additional set.

3. The method of claim 1, wherein each of the images in the acquired set have a corresponding focal distance at an offset from the representative focal distance.

4. The method of claim 1, wherein the ideal focal distance is estimated by comparing focus quality of images in the acquired set.

5. The method of claim 4, wherein comparing the quality of focus further comprises calculating, for each image, a focus score by quantifying differences between neighboring pixels.

6. The method of claim 5, wherein the focus score is a Brenner focus score.

7. The method of claim 5, wherein estimating the ideal focal distance further comprises:
   calculating a difference between logarithms of the focus scores of the images;
   estimating an offset from the calculated difference; and
   estimating the ideal focal distance based on the offset.

8. The method of claim 1, wherein at least two of the images in the acquired set are acquired under illumination by a substantially same color of light, wherein the color of light is at least one of green, yellow, blue and red.

9. The method of claim 5, wherein estimating the ideal focal distance comprises fitting a curve representing logarithms of focus scores as a function of focal distance.

10. A system comprising:
an image acquisition device configured to acquire a set of images of a first location on a substrate based on a representative focal distance; and
one or more processing devices, connected to the image acquisition device, the one or more processing devices configured to:
compute the representative focal distance for the first location based on a set of focal distances at known locations on the substrate, wherein the representative focal distance is estimated as a weighted average of at least two focal distances from the set of focal distances at known locations, wherein a weight for a given focal distance is calculated based on a distance of the corresponding location from the first location,
estimate an ideal focal distance corresponding to the first location based on the acquired set of images, and
store the estimated ideal focal distance and the first location in the set of focal distances at known locations.

11. The system of claim 10, wherein the one or more processing devices are further configured to provide the computed representative focal distance to the image acquisition device.

12. The system of claim 10, wherein the set of images comprises at least two images, and is acquired using a different focal distance for each image at an offset from the representative focal distance.

13. The system of claim 10, wherein
the one or more processing devices are further configured to retrieve the set of focal distances at known locations; and
the image acquisition device is further configured to acquire an additional set of at least two images of a second location, wherein the images in the additional set are each acquired using a different focal distance at an offset from a second representative focal distance calculated for the second location based on the set of known focal distances at known locations.

14. The system of claim 13 wherein the one or more processing devices are further configured to estimate an ideal focal distance corresponding to the second location based on comparing a quality of focus for each of the images in the additional set.

15. The system of claim 10, wherein the one or more processing devices are further configured to compare a quality of focus for the acquired set of images, wherein comparing the quality of focus further comprises calculating, for each image, a focus score by quantifying differences between neighboring pixels.

16. The system of claim 15, wherein the focus score is a Brenner focus score.

17. The system of claim 15, wherein the one or more processing devices are further configured to:
calculate a difference between logarithms of the focus scores of the images;
estimate an offset from the calculated difference; and
estimate the ideal focal distance based on the offset.

18. The system of claim 10, wherein at least two of the images in the acquired set are acquired under illumination by a substantially same color of light, wherein the color of light is at least one of green, yellow, blue and red.

19. The system of claim 15, wherein estimating the ideal focal distance comprises fitting a curve representing logarithms of focus scores as a function of focal distance.

20. A non-transitory computer readable storage device, having encoded thereon computer readable instructions that causes one or more processing devices to execute operations comprising:
obtaining a representative focal distance for a first location on a substrate based on a set of focal distances at known locations on the substrate, wherein the representative focal distance is estimated as a weighted average of at least two focal distances from the set of focal distances at known locations, wherein a weight for a given focal distance is calculated based on a distance of the corresponding location from the first location
estimating an ideal focal distance corresponding to the first location based on the acquired set of images,
storing the estimated ideal focal distance and the first location in the set of focal distances at known locations, and
providing the computed representative focal distance to an image acquisition device for the image acquisition device to acquire a set of images of the first location based on the representative focal distance.

21. The computer readable storage device of claim 20, wherein the operations further comprise:
comparing a quality of focus by calculating, for each image, a focus score by quantifying differences between neighboring pixels.

22. The computer readable storage device of claim 20, wherein the operations further comprise:
calculating a difference between logarithms of the focus scores of the images;
estimating an offset from the calculated difference; and
estimating the ideal focal distance based on the offset.

* * * * *